United States Patent [19]
Craig

[11] Patent Number: 5,134,716
[45] Date of Patent: Jul. 28, 1992

[54] POINT OF SALE AUDIO-VISUAL ADVERTISING SYSTEM

[75] Inventor: David J. Craig, Cremorne, Australia

[73] Assignee: Caltex Oil (Australia) Pty. Limited, Sidney, Australia

[21] Appl. No.: 481,453

[22] Filed: Feb. 15, 1990

[30] Foreign Application Priority Data

Feb. 16, 1989 [AU] Australia ............... PJ2780

[51] Int. Cl.⁵ ............... G09F 27/00; H04B 7/24
[52] U.S. Cl. .................. 455/66; 358/108; 369/29
[58] Field of Search ........ 40/414, 442, 463, 464; 455/66, 53; 358/108; 369/20, 29, 69, 70; 381/82, 83

[56] References Cited

U.S. PATENT DOCUMENTS 4,541,119  9/1985  Cooper et al. ............... 455/57

FOREIGN PATENT DOCUMENTS

3221271A1  12/1983  Fed. Rep. of Germany.
8805707.0  9/1988  Fed. Rep. of Germany.
2146821A  4/1985  United Kingdom.

Primary Examiner—Curtis Kuntz
Assistant Examiner—Chi H. Pham
Attorney, Agent, or Firm—Hill, Van Santen, Steadman & Simpson

[57] ABSTRACT

A point of sale audio-visual advertising system is disclosed which has a central station and a plurality of outstations. The central station is generally located in a shop attached to service or filling stations which sell petroleum products such as gasoline, while the outstations are located at self-service pumps located on the driveway of the service station. The system provides audio-visual advertising material to the purchaser while the tank filling operation is in progress and immediately prior to his entry into the shop area.

7 Claims, 2 Drawing Sheets

POINT OF SALE AUDIO-VISUAL ADVERTISING SYSTEM

BACKGROUND OF THE INVENTION

The present invention relates to a point of sale audio-visual advertising system which finds particular application in the retailing of petrol (gasoline) or other petroleum products and all other goods and services associated with service {or filling}station retailing. Although the present invention will be described in relation to a preferred embodiment for use in such an environment, the present invention is not limited thereto.

In the United States (as in other countries) gasoline or petrol is retailed in outlets termed service stations which provide a number of spaced apart gasoline pumps which are located on a paved area or apron in front of a central station which normally includes a shop for automotive accessories, sweets, softdrinks, and like everyday impulse purchased goods. Increasingly such pumps are self-service pumps and are operated by the purchaser himself. At the conclusion of the filling stage, the purchaser then goes to the central station into the shop area and pays for the purchase of gasoline.

The present invention seeks to provide a means of providing audiovisual advertising material to the gasoline purchaser whilst the tank filling operation is in progress and immediately prior to his entry into the shop area. It is thereby believed that the impact of the advertising will be fresh in the mind of the purchaser thereby resulting in purchases of goods in addition to the purchase of gasoline which originally brought the purchaser to the retail outlet.

SUMMARY OF THE INVENTION

According to the present invention there is disclosed a point of sale audio-visual advertising system comprising a central station and plurality of outstations each spaced apart from said central station., each of said outstations comprising a switch means activatable by a customer, an image reproducing screen, and a loudspeaker means, said screen and loudspeaker means both being connected to a transceiver which is connected to, and activatable by, said switch means; and said central station comprising a transceiver and a video storage means, whereby on activation of any one of said switch means, the corresponding outstation transceiver transmits an enabling signal to said central station transceiver to, if necessary, commence transmission from same of a video signal; said video signal being received by those of said outstation tranceivers which are activated, the image of said video signal being displayed on the corresponding screen and the sound track of said video signal being reproduced by the corresponding loudspeaker means.

The outstation transceiver is disabled by the next subsequent operation of the switch means and transmits an identifying and disabling signal to the central station. When the central station has received disabling signals from all the outstations, the video signal transmission from the central station transceiver is terminated.

Preferably each of the outstations comprises a gasoline pump and information regarding the volume of gasoline dispensed by the pump and the amount of money payable by the customer operating the particular pump, is also transmitted from the corresponding outstation transceiver to the central station transceiver by conventional telemetry techniques where this information is displayed on a console to enable the gasoline transaction to be completed.

BRIEF DESCRIPTION OF THE DRAWINGS

A preferred embodiment of the present invention will now be described with reference to the drawings in which.

DESCRIPTION OF THE PREFERRED EMBODIMENT

Figure 1:
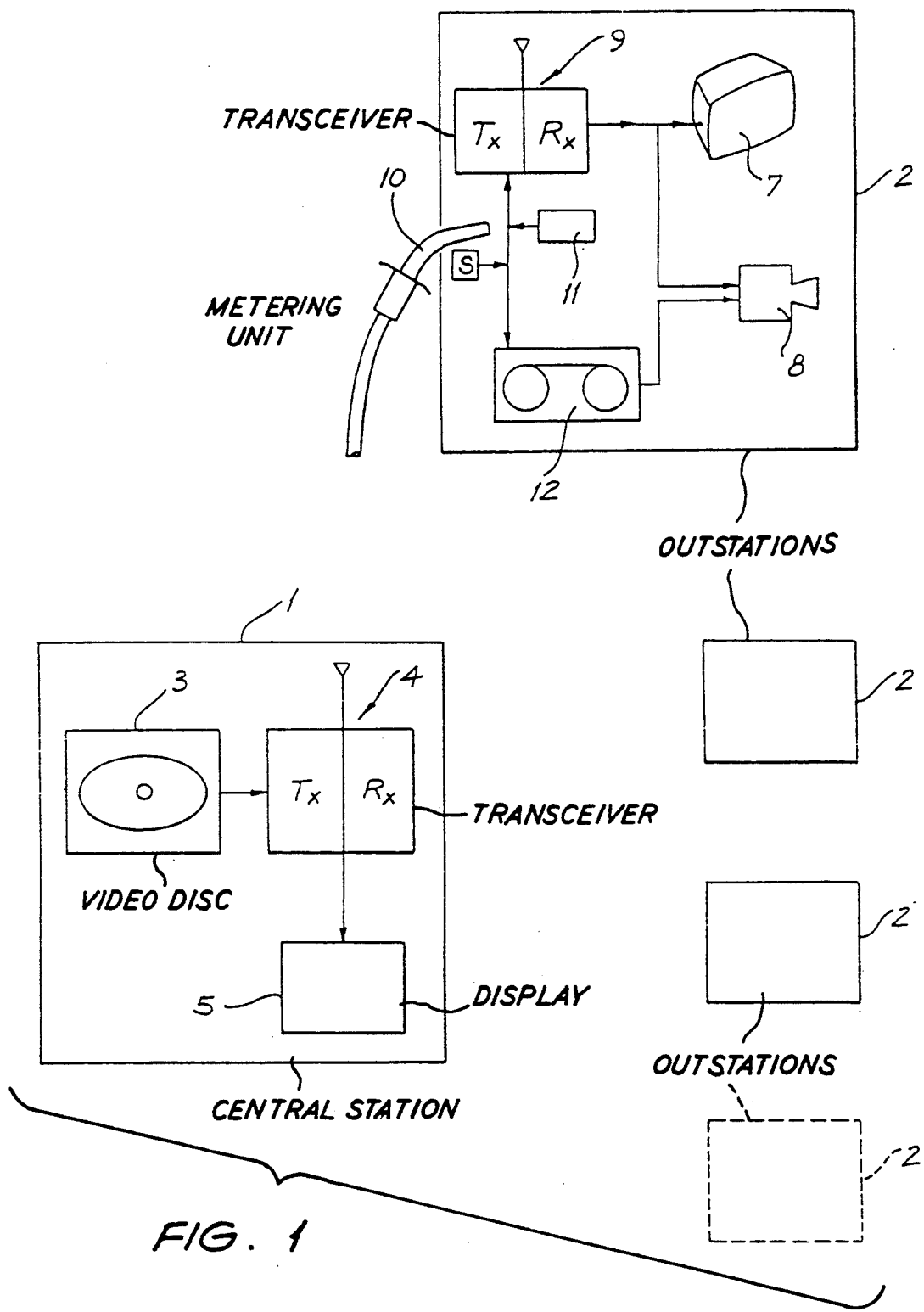
FIG. 1 is a schematic block diagram of the audio-visual advertising system of the preferred embodiment.

As seen in FIG. 1, the system of the preferred embodiment takes the form of a central station 1 and three identical outstations 2. A further outstation 2 is illustrated in broken lines in FIG. 1 in order to indicate that the number of outstations 2 is flexible and is not limited in any way. The outstations 2 are necessarily approved as being suitable for mounting in a location above a hazardous area.

The central station 1 includes a video disc 3 which is connected to a transceiver 4. The transceiver 4 is in turn connected to a gasoline sales display unit 5.

Each of the outstations 2 is provided with a video screen 7, a loudspeaker B and a transceiver 9. In the preferred embodiment each outstation 2 is provided with a switch S of conventional type which is initially operated by the raising of a gasoline delivery nozzle 10 from its cradle (not illustrated) and subsequently operated by the return of the nozzle 10 to the cradle. A metering unit 11 is also connected to the transceiver 9.

A further optional feature is a continuous or conventional taperecorder 12 which is connected to the loudspeaker B and activatable by the switch S.

The sequence of operation is as follows. Assuming that the driveway is initially not attended by any customer. when the first customer approaches an outstation 2 and lifts the nozzle 10 in order to serve himself some gasoline the switch S is activated thereby causing the tape-recorder 12 to broadcast a welcoming audio message by the loudspeaker such as "Welcome to the CALTEX North Ryde Auto Service Centre". Also the transceiver 9 is activated which transmits a signal to the central station transceiver 4 to activate same. In addition, the operation of the switch S also activates the gasoline metering unit 11 in conventional fashion.

The receipt of the transmitted signal from the outstation 2 performs two functions at the central station 1. Firstly, the gasoline sales display unit 5 is activated in the normal manner. this activation as in the prior art arrangement taking place by means of a wire link between the pump of the outstations 2 and the central station 1. However, in addition, the signal activates the transceiver 4 so as to permit a video signal from the video disc 3 to be transmitted via the transceiver 4 to the transceiver 9 of the outstation 2. Activation of the video disc 3 by this sequence may be delayed to allow completion of the message from the optional tape recorder 12 if installed. As a consequence, a video signal is transmitted to the screen 7 for display of the images thereon. whilst the soundtrack of the video signal is reproduced by the loudspeaker 8.

As a result during the tank filling operation, the customer is able to view the screen 7 and listen to the loudspeaker 8. The volume level is normally sufficiently loud to enable any passengers in the vehicle such as the customer's children, to also be subjected to the advertising message. At the conclusion of the tank filling operation, the nozzle 10 is replaced in its cradle thereby operating switch S for a second time This second operation of the switch S disables the transceiver 9 thereby terminating the display on the screen 7 and the emanations from the loudspeaker 8. If desired, the tape recorder 12 at this time can transmit a further message such as "Thank you for patronising the CALTEX North Ryde Auto Service Centre".

Prior to the termination of the transceiver 9, the volume of gasoline sold, and the total price of the transaction have been transmitted from the transceiver 9 to the transceiver 4 for display on the unit 5. In addition, the transceiver 4 is provided with a disablement message from the particular outstation 2 which has been in operation. If this is the only outstation 2 which is currently in use, this data is used to terminate the video signal transmission from the transceiver 4.

In the preferred embodiment the video screens 7 at all the outstations 2, show the same image and are provided with the same audio output. If more than one outstation is activated at a time, then the record and subsequent outstations 2 commence receipt of the transmission from the transciiver 4 during the existing transmission.

Under these circumstances, the video disc 3 is not disabled by the transceiver 4 until each one of all the previously activated outstations 2 has transmitted its disablement message. Then this data is used to terminate the transmission from the transceiver 4.

Figure 2:
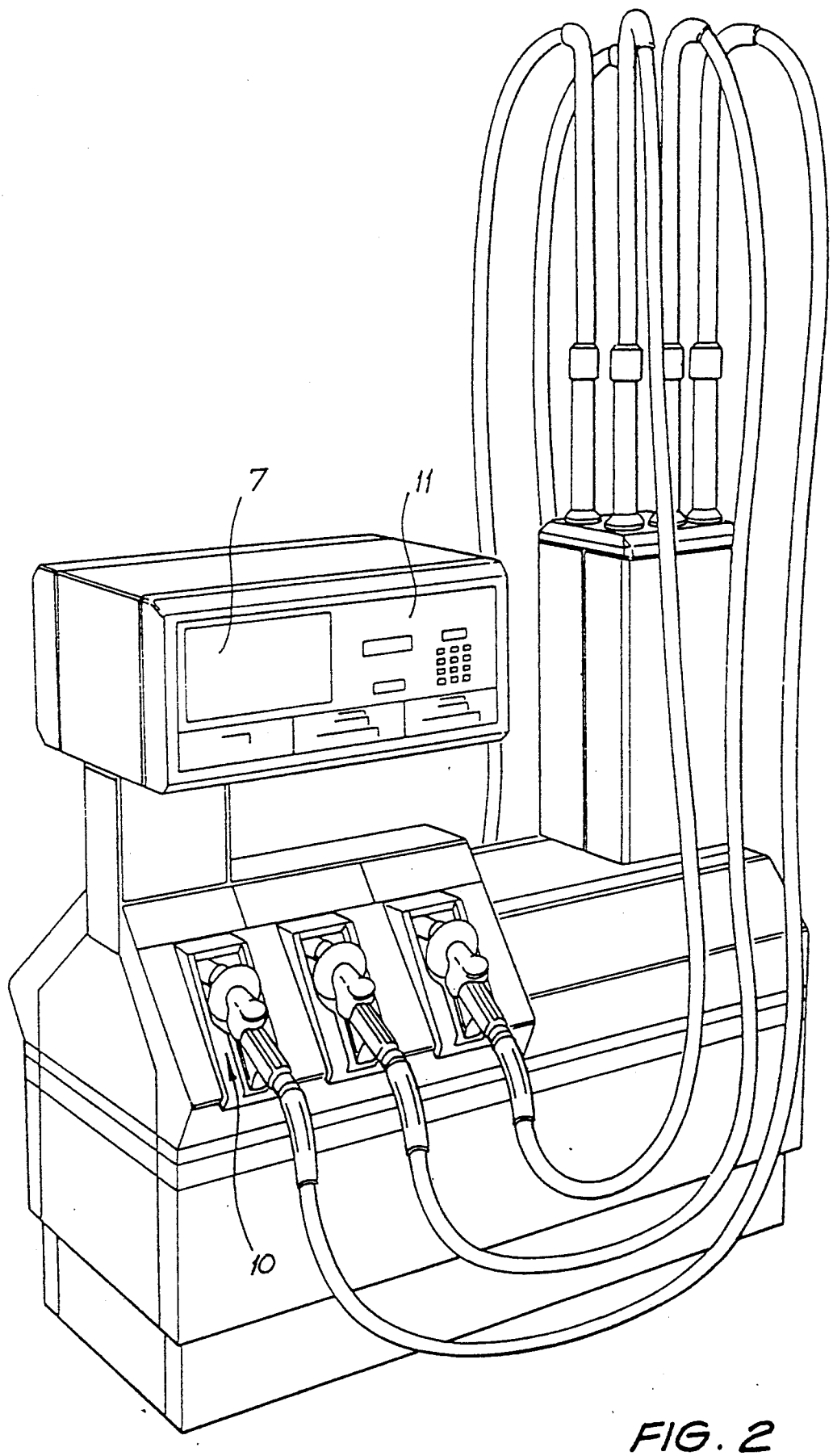
FIG. 2 is a schematic perspective view of a gasoline pump for use with the system of FIG. 1.

FIG. 2 illustrates a typical pump for use in the system of FIG. 1. It will be seen that the pump is provided with the screen 7 positioned in an attention getting location alongside the metering unit 11 and above the nozzles 10.

The foregoing describes only one embodiment of the present invention and modification, obvious to those skilled in the art, can be made thereto without departing from the scope of the present invention. For example, the switch S can be located in any one of a number of positions or take any one of a number of forms. In addition to the arrangement described and illustrated above. the switch S can be activated by the flow of gasoline. Alternatively. the switch S can be an infra-red proximity sensor or an inductive loop in the apron which is respectively activated by the presence of either a person or a vehicle close to the pump concerned to indicate the start of the video.

The foregoing describes a preferred embodiment having a single video player 3 located in the central station 1 for all the outstations 2. In another preferred embodiment there is an individual video player 3 for each outstation 2. In this embodiment the welcome message is initiated followed by the start of a video and audio message at a predetermined initial start position while in the embodiment having only one video player 3 for all the outstations 2 there can be a random start depending on the location where the head(s) of the video disc 3 happens to be.

With the use of the tape recorder 12 being optional, the initial welcoming audio message can be transmitted via a co-axial cable (not illustrated) to the outstations 2, if desired. It is also a preferred feature to have a directional speaker 8.

Another preferred feature is to have a further video screen 7 located in the sales room so that the operator is able to monitor the operation of the disc 3 as well as providing a reinforcement of the advertising message.

What I claim is:

1. A point of sale audio-visual advertising system comprising a central station and plurality of outstations each spaced apart from said central station; each of said outstations comprising a switch means activatable by a customer, an image reproducing screen, and a loudspeaker means, said screen and loudspeaker means both being connected to a transceiver which is connected to, and activatable by, said switch means; and said central station comprising a transceiver and a video storage means, whereby on activation of any one of said switch means, the corresponding outstation transceiver transmits an enabling signal to said central station transceiver to, if necessary, commence transmission from same of a video signal; said video signal being received by those of said outstation transceivers which are activated, the image of said video signal being displayed on the corresponding screen and the sound track of said video signal being reproduced by the corresponding loudspeaker means, wherein the outstation transceiver is disabled by the next subsequent operation of the switch means, and transmits an identifying and disabling signal to said central station, which terminates the signal transmission from the central station transceiver.

2. The system according to claim 1 wherein the transmission from the central station transceiver is terminated following receipt of disabling signals from all outstations previously activated.

3. The system according to claim 1 wherein receipt of a disabling signal from an outstation terminates transmission from the central transceiver to that outstation.

4. The system according to claim 1 wherein each of the outstations comprises a gasoline pump and information regarding the volume of gasoline dispensed by the pump is transmitted from the corresponding outstation transceiver to the central station transceiver.

5. The system according to claim 4 wherein the amount of money payable by the customer operating said gasoline pump is also transmitted from the corresponding outstation receiver to the central station receiver.

6. The system as claimed in claim 4 wherein data transmitted from said outstation is displayed at said central station on a display unit therein.

7. The system according to claim 1 further including a continuous or conventional tape recording means being connected to each said loudspeaker means and being activatable by said switch means.

* * * * *